Aug. 23, 1938.　　　V. R. KOZLOFF　　　2,127,871
APPARATUS FOR STOPPING LEAKS IN SHIPS
Filed Sept. 4, 1935　　　4 Sheets-Sheet 1
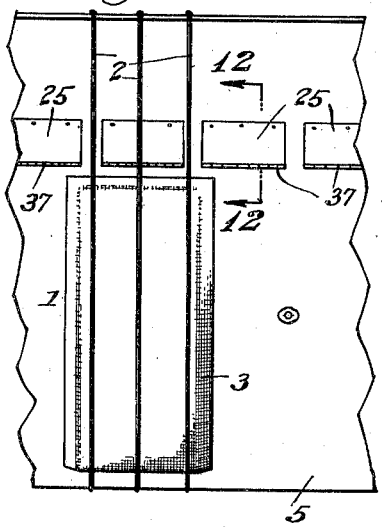
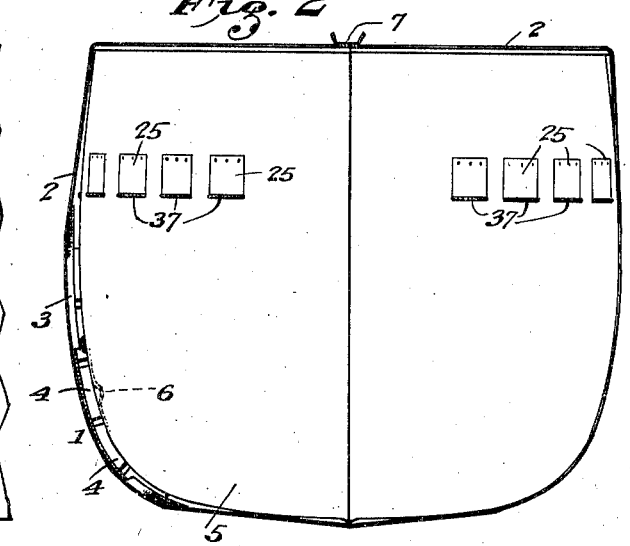
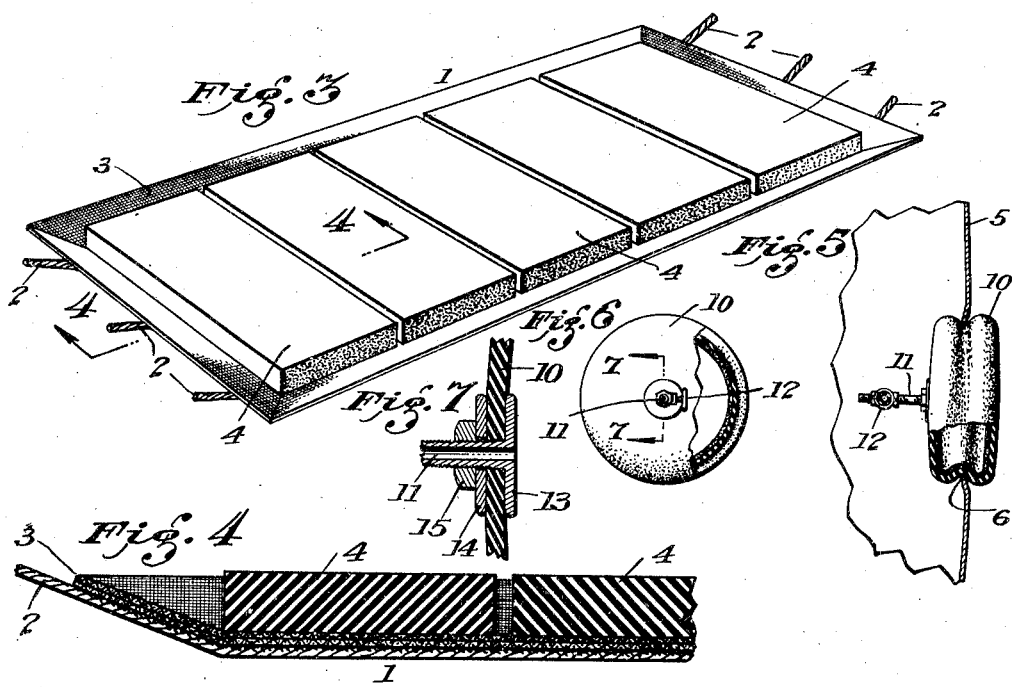
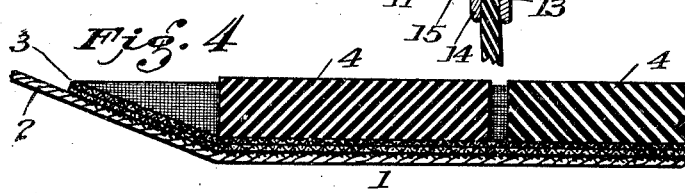
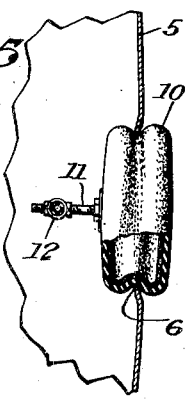
INVENTOR:
Vassil Raynovich Kozloff;
BY
Calvin Brown,
ATTORNEY

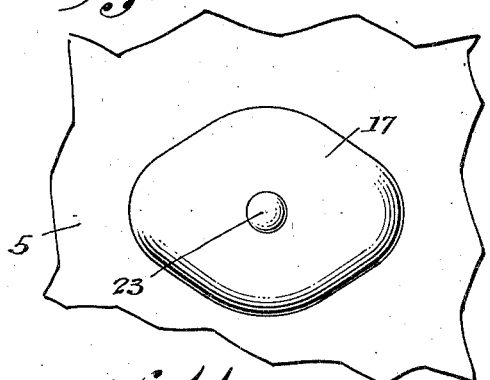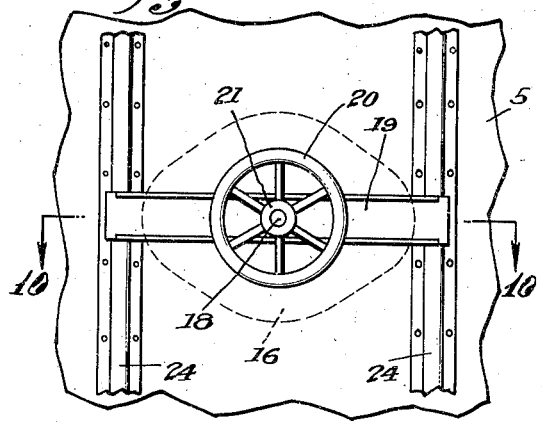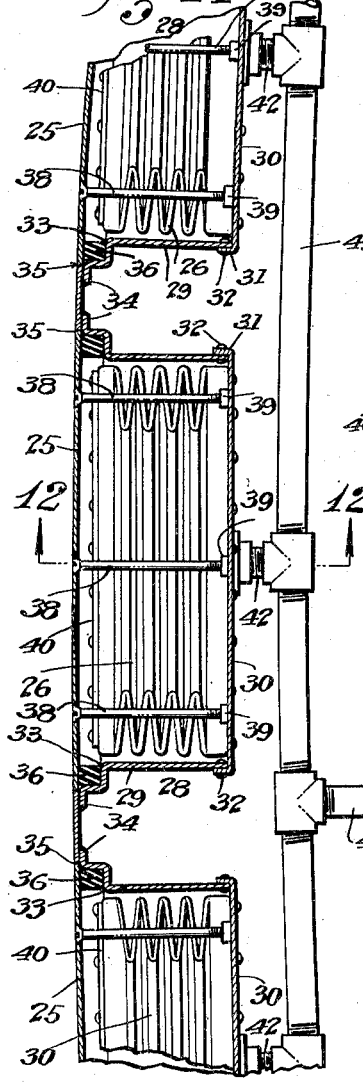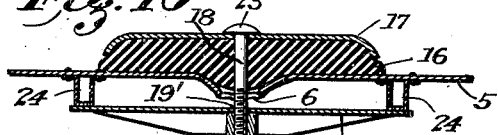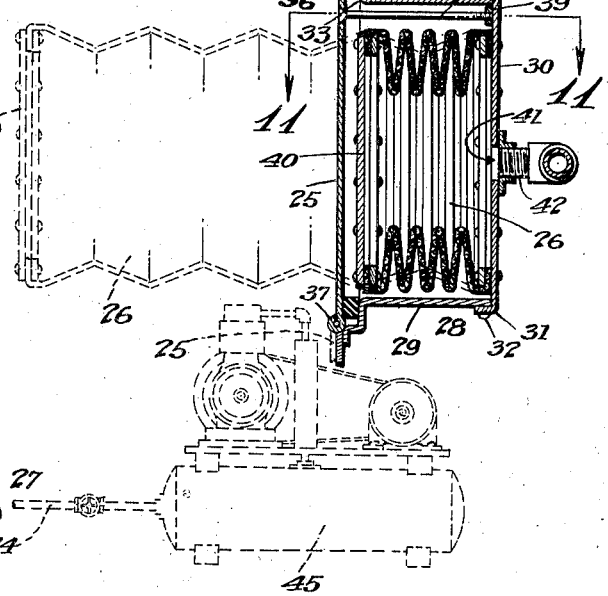

Aug. 23, 1938.  V. R. KOZLOFF  2,127,871
APPARATUS FOR STOPPING LEAKS IN SHIPS
Filed Sept. 4, 1935  4 Sheets-Sheet 3
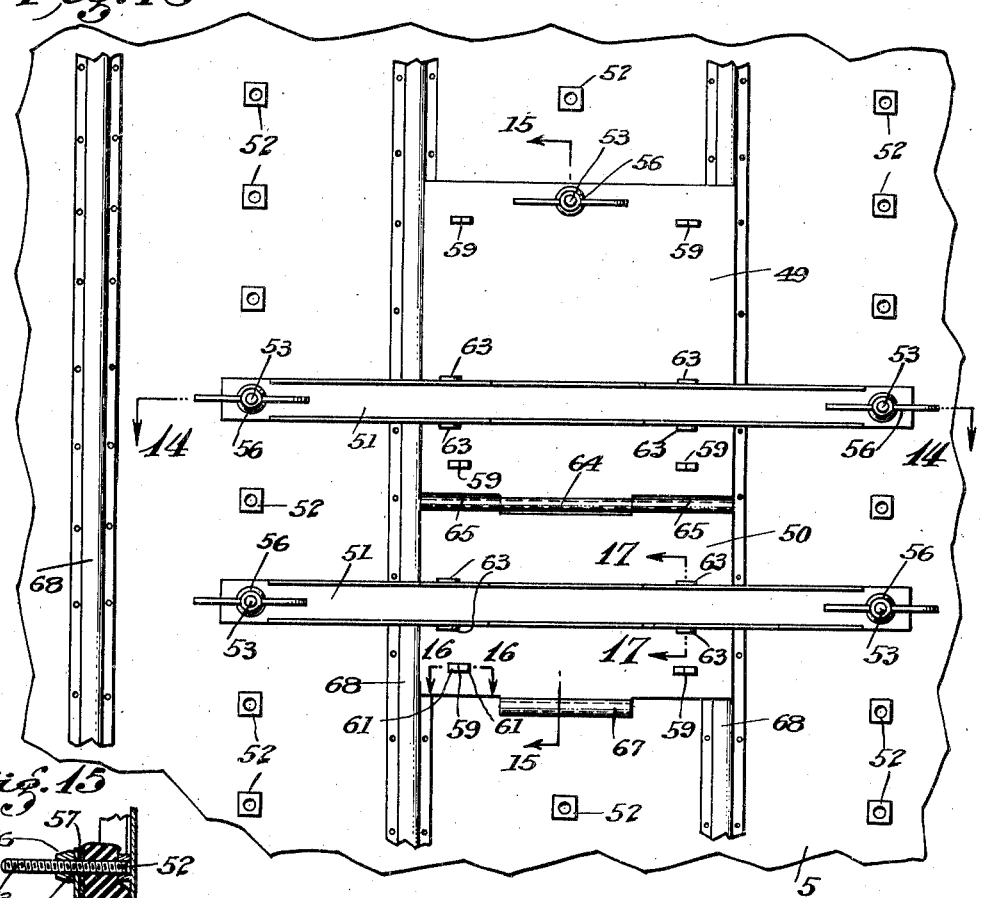
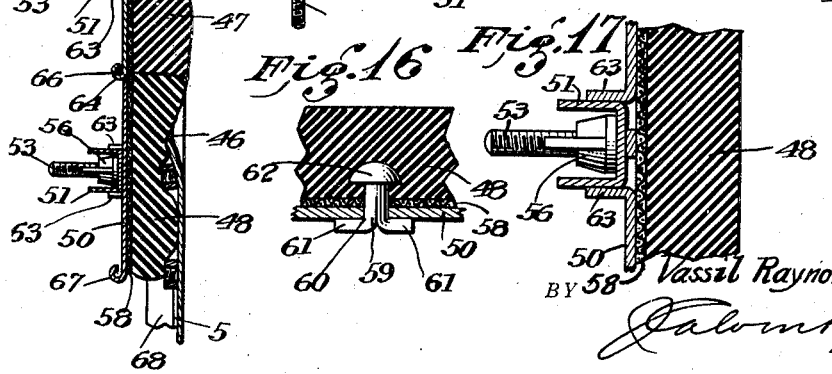
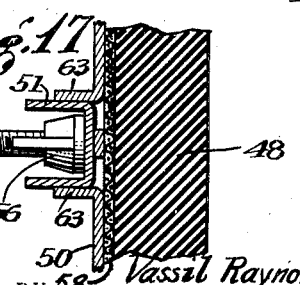
INVENTOR:
Vassil Raynovich Kozloff,
BY
ATTORNEY

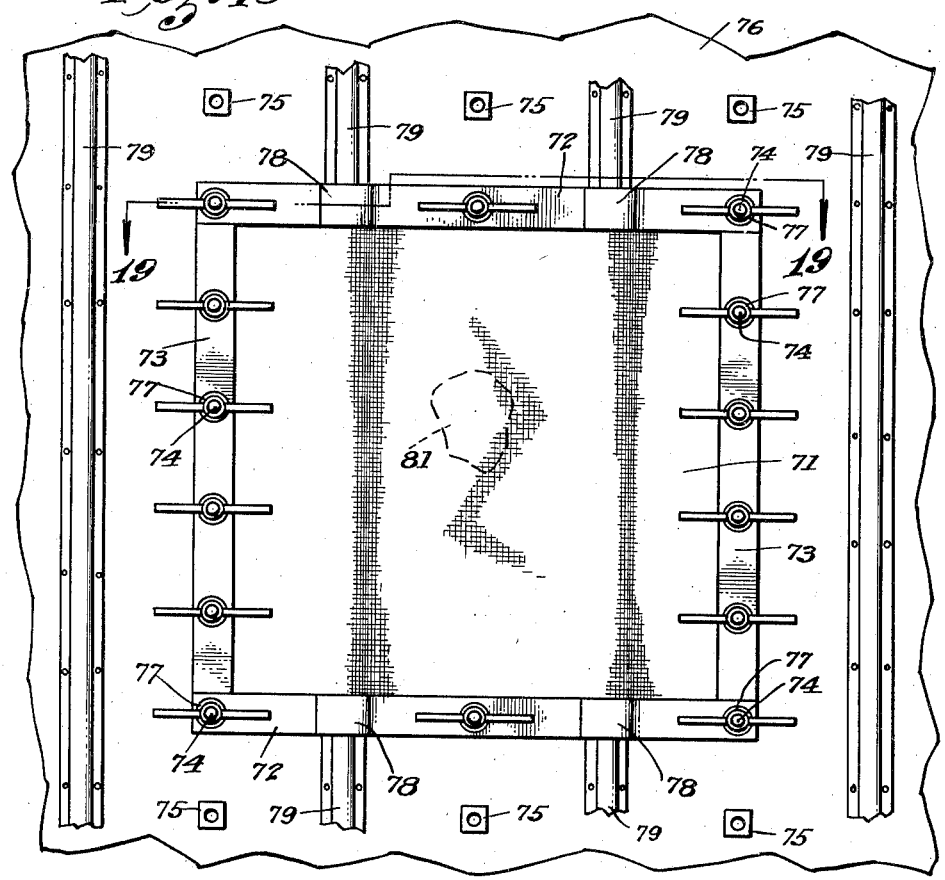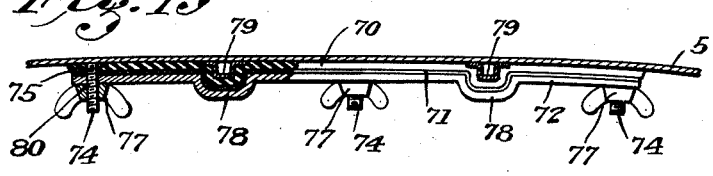

Patented Aug. 23, 1938

2,127,871

UNITED STATES PATENT OFFICE 2,127,871

APPARATUS FOR STOPPING LEAKS IN SHIPS

Vassil Raynovich Kozloff, Los Angeles, Calif.

Application September 4, 1935, Serial No. 39,119

7 Claims. (Cl. 114—227)

This invention relates to means and apparatus for stopping leaks in ships, and preventing sinking thereof.

The general object of the invention is to provide improved means to prevent sinking of boats and ships.

Another object of the invention is to provide improved means for closing a hole in the hull of a ship, which may be quickly and securely placed in position over the hole to stop leakage of water through the hole into the ship.

Another and further object is to provide buoyant means which may be readily operated to buoy up a sinking ship.

Other objects and advantages will appear as this specification progresses.

The invention is illustrated in the annexed drawings, which form a part of this specification, and in which:

Figure 1 is a fragmentary side view of the hull of a ship, showing one form of my invention in position on said hull, closing a hole therein and stopping a leak in the hull, Figure 2 is a front end view of the hull of a ship with my invention shown in position on the hull stopping a leak therein, as illustrated in Figure 1, Figure 3 is a perspective of my invention, as illustrated in Figures 1 and 2, Figure 4 is a fragmentary section taken on line 4—4 of Figure 3, Figure 5 is an edge view, partly in section, of another form of my invention, shown secured in a hole in the hull of a ship, a portion of which hull being shown in section, Figure 6 is a view, partly in section, looking at the inner side of my invention illustrated in Figure 5, Figure 7 is a section taken on line 7—7 of Figure 6, Figure 8 is an outside view of another form of my invention shown in position on closing a hole in the hull of a ship, a portion only of said hull being shown, Figure 9 is an inside view of my invention and the hull of a ship, as illustrated in Figure 8, Figure 10 is a horizontal section taken on line 10—10 of Figure 9, Figure 11 is a fragmentary horizontal section, taken on line 11—11 of Figure 12, of a buoyancy means, embodying my invention, for buoying up a sinking ship, said means being shown diagrammatically in dotted lines, Figure 12 is a transverse vertical section taken on line 12—12 of Figure 11, Figure 13 is an elevation of another form of my invention, shown applied to the inside of a fragment of the hull of a ship closing a hole in said hull, Figure 14 is a horizontal section taken on line 14—14 of Figure 13, Figure 15 is a transverse vertical section taken on line 15—15 of Figure 13, Figure 16 is a fragmentary section of a detail of construction taken on line 16—16 of Figure 13, Figure 17 is a fragmentary section of a detail of construction taken on line 17—17 of Figure 13, Figure 18 is an elevation of another form of my invention, shown applied to the inside of a fragment of the hull of a ship over a hole in said hull, and, Figure 19 is a sectional view taken on the line 19—19 of Figure 18.

Corresponding parts are designated by the same reference characters in all the figures of the drawings.

The form of my invention illustrated in Figures 1 to 4, inclusive, includes a flexible shoe 1 and a plurality of ropes 2 extending lengthwise of said shoe over the back thereof and beyond the ends respectively of said shoe. The shoe 1 comprises a sheet of fabric 3, and a plurality of rubber pads 4, disposed side-by-side and spaced a slight distance apart, which pads are vulcanized to the inner side of said sheet of fabric. The spacing of the pads 4 gives flexibility to the shoe 1 so that it may bend and fit the curvature of the hull of a ship. The ropes 2, preferably three in number, are spaced apart in parallel relation on the back of the fabric 3 and are sewed or otherwise secured to said fabric.

Should the hull 5 of a ship spring a leak through a hole 6 punched through said hull below its water level, the shoe 1 and ropes 2 may be thrown over the bow of the ship and moved along the hull to the position of said hole, in which position, by drawing said ropes one way or the other, one of the shoe pads 4 is brought over said hole and said ropes are drawn tight around the hull 5, and their ends are tied together over said hull as at 7, causing the shoe 1 to bend and conform to the hull, and said pad 4 to close the hole 6 watertight and stop the leak through said hole into said hull.

The form of my invention illustrated in Figures 5 to 7, inclusive, comprises a flexible bag 10 of canvas and rubber or other suitable material, in the inner side of which is secured one end of a metal tube 11 controlled by a valve 12, the other end of which tube is threaded to be connected to an air compressor, not shown. The inner end of the tube 11 is secured in the wall of the bag 10 by a flange 13 on the inner end of said tube, a washer 14 fitted on said tube, and a nut 15 in threaded engagement with said tube, the flange 13 engaging the inside of the wall of the bag and the flange 14 engaging the outside of the wall of the bag, while the nut 15 engages the washer 14 to clamp the wall of the bag between said flange and washer.

The bag 10 may be fitted in the hole 6 in the hull 5 and inflated by an air compressor connected to the tube 11, whereby said bag is caused to close said hole water-tight and prevent leakage therethrough into said hull, as illustrated in Figure 5.

The form of my invention shown in Figures 8 to 10, inclusive, comprises a rubber pad 16, a dished base plate 17 in which said pad is secured, a bolt 18 extending centrally through said base plate and pad, a bridge bar 19 through which said bolt extends through an opening 19' in said bridge intermediate its ends, and a band wheel 20 formed with an internally threaded hub 21 which engages a thread 22 on said bolt. The head 23 of the bolt 18 engages the outside of the base plate 17.

To close a hole 6 in the hull 5 of a ship, the bolt 18 is first inserted from the outside of the hull through said hole and the pad 16 brought against the outside of the hull over said hole; the bolt 18 is then inserted through the opening 19' in the bridge 19 and said bridge is placed with its ends against two ribs 24 respectively, within the hull 5; and the hand wheel 20 is then screwed on the bolt 18 against the bridge 19 until the pad 16 is drawn tightly against the outside of the hull 5 and the hole 6 closed water-tight by said pad.

My invention, as illustrated in Figures 11 and 12 of the drawings, comprises a plurality of doors 25 in the sides of the hull 5 of the ship, above the water line of the hull, a plurality of bellows 26 mounted within the hull 5 opposite said doors respectively, and means 27 for inflating said bellows. Each of the bellows 26 is mounted within a casing 28 comprising a rectangular box wall 29 and an inner end wall 30 formed with a right angular flange 31 around its edges, which flange fits over the inner end of said box wall and is secured thereto by bolts 32. The forward end of the box wall 29 is formed with a recess 33 and an external flange 34 which is secured to the inside of the hull 5 of the ship at the edge of the opening 35 in the hull 5 for a door 25, there being a packing ring 36 fitted in said recess, which packing ring is engaged by the door 25 when closed, forming a water-tight joint between the edge of said door and the edge of the door opening 25. Each of the doors 25 is hinged at its lower edge to the lower edge of a door opening 35 by a hinge 37, and the door is normally held closed within the door opening 35 by an elongated screw bolt 38 which extends through the lower part of the door from the outside thereof and its inner threaded end engages a threaded socket 39 on the inside of the end wall 30 of the casing 28. The inner end of each bellows 26 is secured to the inside of the end wall 30 of the casing 28 in which the bellows is located, whereby the bellows is mounted in the casing, said end wall of the casing forming the inner end wall of the bellows. The outer end of each bellows is closed by its own end wall 40. The inner end wall 30 of each bellows casing 28 is provided with a port 41 communicating with the interior of the bellows 26 in said casing, and the port 41 of each casing is connected by a short pipe section 42 to a pipe 43, which is connected to a pipe 44 leading from an air compressor 45 located aboard the ship, in which my invention is installed.

When all other means, such as disclosed in Figures 1 to 10, inclusive, and in Figures 13 to 17, inclusive, are not used to prevent sinking of the ship, my invention as disclosed in Figures 11 and 12, may be utilized. This is accomplished by first unscrewing the screw bolts 38 from the sockets 39 and then inflating the bellows 26, by means of the air compressor 45, which pumps air under pressure through pipes 44, 43 and 42 into said bellows and projects said bellows outwardly from the hull of the ship through the door openings 35 into the position shown in dotted lines in Figure 12, the doors 25 swinging open under pressure of the forward end of the bellows thereagainst. The inflated bellows projected from the sides of the hull of the ship buoy up the ship and prevent it from sinking, or at least hold up the ship long enough to enable the passengers of the ship to escape therefrom in life boats, or otherwise.

My invention, as illustrated in Figures 13 to 17, inclusive, may be utilized for closing large holes 46 in the hull 5 of a ship, as particularly illustrated in Figure 15. This form of my invention comprises rubber pads 47 and 48, plates 49 and 50 secured to the back of said pads, respectively, bridge beams 51, nuts or threaded sockets 52 welded or otherwise secured to the inner side of the ship's hull 5, threaded studs 53 which may be screw-seated at one end in any of said threaded sockets and inserted through apertures 54 in the ends of said bridge beams, and through an opening 55 in the upper part of the plate 49 and pad 47, and butterfly nuts 56 for screwing on said threaded studs 53 against the ends of said bridge beam and against said plate 49. Sheets 57 and 58 of fabric are vulcanized to the back of the pads 47 and 48, respectively, and rest against the plates 49 and 50 respectively. Said sheets of fabric 57 and 58 may also, if desirable, be vulcanized to the plates 49 and 50 respectively. The pads 47 and 48 are preferably secured to the plates 49 and 50 respectively by vulcanizing the same to rivets 59 over the heads thereof, as illustrated in Figure 16, which rivets extend outwardly through apertures 60 in said plates and their ends 61 are bent upon the outer side of said plates, so that the heads 62 of rivets are spaced inwardly an appreciable distance from said plates to anchor pads securely on said plates. Each plate 49 and 50 is formed with two pairs of outstanding spaced lugs 63, which pairs of lugs are located respectively at the opposite sides edges of said plates between which pairs of lugs of each of said plates is positioned a bridge beam 51. The plate 49 is formed with a sleeve 64 at its lower edge intermediate its side edges adapted to fit between a pair of sleeves 65 formed on the upper edge of an adjoining plate 50 and a rod 66 is inserted through said sleeves 65 and 64 to connect the plates 49 and 50 at their said adjoining edges. The plate 50 is formed with a sleeve 67 at its lower edge intermediate its side edges to fit between the sleeves 65 on the upper edge of another plate 50 and said plates 50 may be connected together by a rod 66 extended through said sleeves 65 and 64.

When a large opening 46 is broken through the hull 5 of the ship, a stud 53 is first screw-seated at one end in a socket 52 a sufficient distance above said opening; a pad 47 is then placed over said opening 46, or a part of said opening from its upper end downwardly, between two ribs 68 on the inside of the hull 5, and said stud is inserted through the opening 55 in the upper part of said pad and its back plate 49; a butterfly nut 56 is screwed on the outer end of said stud tightly against said plate; a pair of studs 53 are screw-seated at one end in two sockets 52 respectively at opposite sides of said plate 49; a bridge 51 is then placed over said plate between both pairs of its lugs 63 and said pair of studs are respectively introduced through the apertures 54 in the ends of said bridge; butterfly nuts 56 are then screwed on the ends of said studs respectively tightly against said bridge member until the pad 49 is clamped tightly against the inside of the hull over said opening 46 or partly over said opening, as shown in Figure 15. If the pad 47 does not cover the opening 46 completely, a pad 48 is placed over the lower part of said opening below the pad 47, while the sleeves 65 on the upper edge of the back plate 50 of said pad are introduced over the ends respectively of the sleeve 67 on the lower edge of said plate 49, and a pin 66 is introduced through said sleeves 65 and 64; two studs 53 are then screw-seated in two sockets 52 respectively, at opposite sides of the plate 50; a bridge beam 51 is then placed between both pairs of lugs 63 on said plate and said two studs introduced through the apertures 54 respectively in the ends of said bridge beam; butterfly nuts 56 are then screwed on said two studs against the ends of said bridge beam until the pad 48 is clamped tightly against the inside of the hull 5 over the lower portion of the opening 46 in said hull, thus completely closing said opening and stopping the leak therethrough into said hull.

My invention, as illustrated in Figures 18 and 19 comprises a sheet of rubber 70, to the back of which is vulcanized a sheet of fabric 71, metal strips 72 vulcanized to the back of said sheets of fabric and rubber at the upper and lower edges thereof, respectively, metal strips 73 vulcanized to said sheets at the sides thereof respectively, studs 74 adapted to be screw-seated in any of a plurality of threaded sockets 75 in the inside of the hull 76 of the ship, and butterfly nuts 77 adapted to screw on said studs, said strips 72 being formed with offsets 78, spaced to allow the rubber sheet 70 to fit over the ribs 79 on the inside of the hull 76, and there being openings 80 extending through the strips 72 and 73, the fabric sheet 71 and rubber sheet 70 to receive said studs.

When a hole 81 is broken through the hull 76 of the ship, the studs 74 are first screw-seated in the sockets 75 surrounding said hole; the rubber seat 70 is then placed over the hole 81 against the inside of the ship over two ribs 79, while the studs in said sockets are projected through the openings 80 in said rubber sheet, fabric sheet 71, and the strips 72 and 73, said rubber sheet, fabric sheet and the offsets 78 in the strips 72 straddling said ribs so that said rubber sheet may rest against the inside of the hull 76; and the butterfly nuts 77 are then screwed on the studs 74 against the strips 72 and 73 until the rubber sheet 70 is clamped water tight against the hull over the hole 81, thus stopping leakage through said hole.

I do not limit my invention to the exact construction herein described and disclosed, because various changes may be made therein without departing from the spirit of the invention.

I claim:

1. Apparatus for stopping leaks in vessels comprising a sheet of rubber placed over a hole in the hull of a ship, a fabric sheet vulcanized to the back of said rubber sheet, strips vulcanized to said fabric sheet and said rubber sheet along the edges thereof, said strips and said sheets being provided with openings extending therethrough, internally threaded sockets permanently secured to the hull beneath the strips, studs externally threaded throughout their entire length adapted to be threaded in the sockets and projecting through the openings in the strips, and nuts threaded on said studs against the strips to clamp the sheet of rubber against the hull over the hole.

2. The combination with a ship's hull, of a plurality of spaced rows of internally threaded sockets permanently secured to the inner side of said hull, a pad for stopping leaks in the hull, studs externally threaded throughout their length adapted to be threaded in certain sockets adjacent the leak and projecting inwardly from said sockets, engaging means applied to the pad and provided with apertures to receive the projecting studs, and nuts threaded on said studs against the engaging means for clamping said pad against the inner face of the hull over the leak.

3. The combination with a ship's hull having spaced ribs, a plurality of rows of internally threaded sockets permanently secured to the hull, each row being positioned between a pair of ribs, a pad for stopping leaks in the hull of a size to be snugly positioned between a pair of ribs, studs externally threaded throughout their length adapted to be threaded in certain sockets of rows adjacent the pad engaged ribs and projecting inwardly from said sockets, a bridge engaging the rear face of said pad and having projecting apertured end portions passing over the projecting studs, and nuts threaded on said studs for forcing the bridge against the pad and clamping the pad against the hull over the leak.

4. The combination with a ship's hull having spaced ribs, a plurality of rows of internally threaded sockets permanently secured to the hull, each row being positioned between a pair of ribs, a pad for stopping leaks in the hull of a size to be snugly positioned between a pair of ribs, studs externally threaded throughout their length adapted to be threaded in certain sockets of three parallel rows, the center row being between the ribs receiving the pad, said pad having an opening adjacent its upper edge through which the center stud projects, a bridge engaging the rear face of said pad and having projecting apertured end portions passing over the studs of the outer rows of sockets, a nut threaded on the center stud for initially clamping the pad in position, and nuts threaded on the outer studs for forcing the bridge against the pad and clamping the pad against the hull over the leak.

5. The combination with a ship's hull, of a plurality of spaced rows of internally threaded sockets permanently secured to the inner side of said hull, a plurality of pads placed end to end over a leak in the hull, means for detachably and hingedly connecting said pads together, studs externally threaded throughout their length adapted to be threaded in certain sockets of rows adjacent the side edges of the pads, a bridge engaging the rear face of each pad and having projecting apertured end portions passing over the adjacent studs, and nuts threaded on said studs for forcing the bridges against the pads and clamping the pads against the hull over the leak.

6. Means for securing a leak stopper arrangement including a pad and stud means cooperating therewith over a leak in the hull of a ship comprising; in combination with said hull, a plurality of devices separate from the ship's framing permanently secured at various points over the inner surface of said hull having readily engageable means for attachment thereto of said stud means, whereby when a leak occurs through said hull a plurality of said devices are readily available in the vicinity of said leak to fasten the leak stopping pad by said stud means to said devices over the leak.

7. For the purpose of stopping leaks in the hull of a ship with a pad and cooperating threaded studs; the combination with the hull of the ship, of a plurality of devices separate from the ship's framing permanently secured at various points to the inner surface of the hull having readily engageable means for attachment thereto of said studs whereby when a leak occurs through said hull a plurality of such devices are readily available in the vicinity of the leak to fasten the leak stopping pad by said studs to said devices over the leak.

VASSIL RAYNOVICH KOZLOFF.